(12) United States Patent
Shimamoto et al.

(10) Patent No.: US 12,320,590 B2
(45) Date of Patent: Jun. 3, 2025

(54) BLAST FURNACE FAULT DETERMINATION APPARATUS, METHOD FOR DETERMINING FAULT IN BLAST FURNACE, AND METHOD FOR OPERATING BLAST FURNACE

(71) Applicant: JFE STEEL CORPORATION, Tokyo (JP)

(72) Inventors: Hiroyuki Shimamoto, Tokyo (JP); Tomohiko Ito, Tokyo (JP); Tatsuya Yamaguchi, Tokyo (JP); Nozomu Nishimura, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 778 days.

(21) Appl. No.: 17/440,913

(22) PCT Filed: Mar. 31, 2020

(86) PCT No.: PCT/JP2020/014881
§ 371 (c)(1),
(2) Date: Sep. 20, 2021

(87) PCT Pub. No.: WO2020/204043
PCT Pub. Date: Oct. 8, 2020

(65) Prior Publication Data
US 2022/0163260 A1 May 26, 2022

(30) Foreign Application Priority Data

Apr. 3, 2019 (JP) .................................. 2019-071012
Apr. 3, 2019 (JP) .................................. 2019-071016

(51) Int. Cl.
*F27B 1/28* (2006.01)
*C21B 5/00* (2006.01)
(Continued)

(52) U.S. Cl.
CPC .................. *F27B 1/28* (2013.01); *C21B 5/00* (2013.01); *G05B 23/0221* (2013.01); *F27D 2021/0007* (2013.01)

(58) Field of Classification Search
None
See application file for complete search history.

(56) References Cited

U.S. PATENT DOCUMENTS

2016/0148365 A1  5/2016  Tsuda et al.
2022/0163260 A1  5/2022  Shimamoto et al.

FOREIGN PATENT DOCUMENTS

CN  101886152 A  11/2010
CN  103328657 A  9/2013
(Continued)

OTHER PUBLICATIONS

Apr. 8, 2022 extended Search Report issued in European Patent Application No. 20783058.9.
(Continued)

*Primary Examiner* — Jason Lau
(74) *Attorney, Agent, or Firm* — Oliff PLC

(57) ABSTRACT

A blast furnace fault determination apparatus includes a processor configured to: calculate a fault index indicative of a degree of fault in a blast furnace; calculate a ventilation
(Continued)

index of the blast furnace; and determine a fault condition in the blast furnace using the fault index and the ventilation index.

6 Claims, 4 Drawing Sheets

(51) Int. Cl.
*G05B 23/02* (2006.01)
*F27D 21/00* (2006.01)

(56) References Cited

FOREIGN PATENT DOCUMENTS

| | | | |
|---|---|---|---|
| CN | 104302787 | A | 1/2015 |
| CN | 103361454 | B | 3/2015 |
| CN | 105392904 | A | 3/2016 |
| CN | 108595380 | A | 9/2018 |
| EP | 2 851 437 | A | 3/2015 |
| JP | 2009-054843 | A | 3/2009 |
| JP | 2015-140455 | A | 8/2015 |
| JP | 2017-088950 | A | 5/2017 |
| JP | 2017128805 | A * | 7/2017 |
| JP | 2017-165999 | A | 9/2017 |
| JP | 2017-190482 | A | 10/2017 |
| JP | 2018-009224 | A | 1/2018 |
| JP | 2018-159111 | A | 10/2018 |
| JP | 2018-165399 | A | 10/2018 |
| JP | 2018-204076 | A | 12/2018 |
| RU | 2 663 015 | C2 | 8/2018 |
| SU | 992590 | A1 | 1/1983 |
| SU | 1447859 | A1 | 12/1988 |
| TW | I435936 | B | 5/2014 |
| TW | I745912 | B | 11/2021 |

OTHER PUBLICATIONS

May 7, 2022 Office Action issued in Chinese Patent Application No. 202080023159.9.

Oct. 10, 2022 Office Action issued in Chinese Patent Application No. 202080023159.9.

Jul. 28, 2022 Office Action issued in Russian Patent Application No. 2021128714.

Shiau et al., A Visualization Technique to Predict Abnormal Channeling Phenomena in the Blast Furnace Operation, 2018, p. 49-59, vol. 70, No. 4.

Yi et al., A Knowledge Based System to Predict Channeling Phenomena in the Blast Furnace Operation, RISC Research dissertation, 1994, vol. 8, No. 3.

Xiang et al, Blast Furnace Design: Theory and practice of ironmaking process design, 2007, p. 164-166.

Dunia et al, Identification of Faulty Sensors Using Principal Component Analysis, Process System Engineering, 1996, vol. 42 No. 10.

Li et al, Improved PCA method for sensor fault detection and isolation in a nuclear power plant, Nuclear Engineering and Technology, 2019, p. 146-154, 51.

Jan. 11, 2023 Office Action Issued in Taiwanese Patent Application No. 109111280.

Jun. 9, 2020 International Search Report issued in International Patent Application No. PCT/JP2020/014881.

"Statistical Process Control Using Process Chemometrics". Institute of Systems, Control, and Information Engineers, 2004, vol. 48, No. 5, pp. 165-170.

Nov. 23, 2020 Office Action issued in Taiwanese Patent Application No. 109111280.

Oct. 13, 2020 Office Action issued in Japanese Patent Application No. 2020-546515.

* cited by examiner

BLAST FURNACE FAULT DETERMINATION APPARATUS, METHOD FOR DETERMINING FAULT IN BLAST FURNACE, AND METHOD FOR OPERATING BLAST FURNACE

FIELD

The present invention relates to a blast furnace fault determination apparatus, a method for determining a fault in a blast furnace, and a method for operating a blast furnace.

BACKGROUND

In recent blast furnace operation at a low-coke rate, it is important to identify or estimate the conditions of the furnace, more specifically, conditions of ventilation inside the furnace and any change in the conditions, correctly and as quick as possible to keep the furnace in good condition. A conventional ventilation index that indicates the conditions of ventilation in a furnace uses, for example, a ventilation resistance calculated from a difference value between the furnace top pressure and the blast pressure. The ventilation index has a threshold to determine a decrease in ventilation. When the ventilation index exceeds the threshold, ventilation is determined to be decreased. Patent Literature 1 describes a method for determining a fault by inputting shaft pressure and calculating a fault index using a statistical technique such as the principal component analysis. The method of Patent Literature 1 makes a fault determination by creating a fault index from the ratio between the Q statistic calculated based on data of the stability limit and the Q statistic calculated based on operation data of a target of fault detection, and setting a threshold for the calculated fault index. It is also necessary to detect a fault in a sensor itself that is used for a fault determination associated with operation. Fault detection in a sensor is usually performed by setting an upper limit and a lower limit to output values of the sensor. Patent Literature 2 describes a method of fault detection in a sensor installed to the periphery of a blast furnace body, using output values of the nearby sensors.

CITATION LIST

Patent Literature

Patent Literature 1: Japanese Patent Application Laid-open No. 2017-128805
Patent Literature 2: Japanese Patent Application Laid-open No. 2017-190482

Non Patent Literature

Non Patent Literature 1: Statistical Process Control Using Process Chemometrics, Systems, control and information, 2004, vol. 48, no. 5, p. 165-170

SUMMARY

Technical Problem

The method of Patent Literature 1 has a problem in that the fault index increases not only when operation is actually experiencing a fault condition but when there is a fault in a sensor to detect operation data. Operation may therefore be determined to be experiencing a fault condition, although the fault is not associated with operation. In other words, use of only a statistical fault index cannot distinguish a fault associated with operation from a fault in a sensor, and this method using a fault index is therefore not effective enough to detect a fault in a blast furnace. Conventional methods determine a fault in a sensor by using a threshold set for the output value of each sensor and monitoring unusual behavior of an individual sensor. A wide range of normal output values is therefore allowed for the sensor, which means that a fault in the sensor is detected only when the degree of fault in the sensor becomes sufficiently large. Detection of a fault is therefore delayed. Particularly, a shaft-pressure sensor of a blast furnace, which is an important sensor to manage ventilation and other functions, frequently experiences fault conditions due to, for example, clogging of the blast dust or similar reasons. Early fault detection is therefore necessary. Use of a threshold is effective in determining a fault, when the output value of the sensor sharply rises from a normal value range to an abnormal level. This manner using a threshold is, however, difficult detecting such a fault in which the output value gradually shifts out of the normal value range. The method described in Patent Literature 2 determines a fault in a target sensor to be determined, based on a mean and a variance of output values of sensors located close to the target sensor. This method, however, does not consider synchronicity between output values of the sensor group, which frequently occurs in normal operation. If asynchronicity between output values of a plurality of sensors is taken into consideration, detection of a fault, which is supposed to be detected earlier, may be delayed.

From the above viewpoint, the present invention aims to provide a blast furnace fault determination apparatus, a method for determining a fault in a blast furnace, and a method for operating a blast furnace, with which a fault associated with operation and a fault in a sensor can be separately determined.

Solution to Problem

A blast furnace fault determination apparatus according to the present invention includes: a fault index calculation unit configured to calculate a fault index indicative of a degree of fault in a blast furnace; a ventilation index calculation unit configured to calculate a ventilation index of the blast furnace; and a determination unit configured to determine a fault condition in the blast furnace using the fault index calculated by the fault index calculation unit and the ventilation index calculated by the ventilation index calculation unit.

The fault index calculation unit may be configured to calculate the fault index using an output value of a shaft-pressure sensor group installed around a furnace body of the blast furnace.

The fault index may be a Q statistic based on principal component analysis.

The blast furnace fault determination apparatus may include a sensor fault identification unit configured to evaluate a degree of attribution on the Q statistic and identify a faulty sensor based on the degree of attribution in a case where the ventilation index does not exceed a predetermined threshold and the Q statistic exceeds a predetermined threshold.

The blast furnace fault determination apparatus may include a faulty sensor removal unit configured to continue a fault determination by removing a signal value of a sensor identified as a faulty sensor by the sensor fault identification unit based on calculation of the Q statistic and calculating a new Q statistic.

The ventilation index may be calculated by following expression (1), where a parameter X in the expression (1) is a numerical value adjusted to allow an amount of gas generation in the blast furnace and the ventilation index to be expressed in a substantially linear relation for a change in the amount of gas generation in the blast furnace.

$$\text{Ventilation index} = \frac{\text{Furnace pressure value } A^2 - \text{Furnace pressure value } B^2}{(\text{Amount of gas generation in blast furnace})^{1 \cdot X}} \quad (1)$$

A method for determining a fault in a blast furnace according to the present invention includes: a fault index calculation step of calculating a fault index indicative of a degree of fault in the blast furnace; a ventilation index calculation step of calculating a ventilation index of the blast furnace; and a determination step of determining a fault condition in the blast furnace using the fault index calculated at the fault index calculation step and the ventilation index calculated at the ventilation index calculation step.

A method for operating a blast furnace according to the present invention includes a step of operating the blast furnace while determining a fault condition in the blast furnace using the blast furnace fault determination apparatus according to the present invention.

Advantageous Effects of Invention

With a blast furnace fault determination apparatus, a method for determining a fault in a blast furnace, and a method for operating a blast furnace according to the present invention, a fault associated with operation and a fault in a sensor can be separately determined.

DESCRIPTION OF EMBODIMENTS

The configuration of a blast furnace fault determination apparatus according to a first embodiment and a second embodiment of the present invention and operation thereof will now be described with reference to the drawings.

First Embodiment

Figure 1:
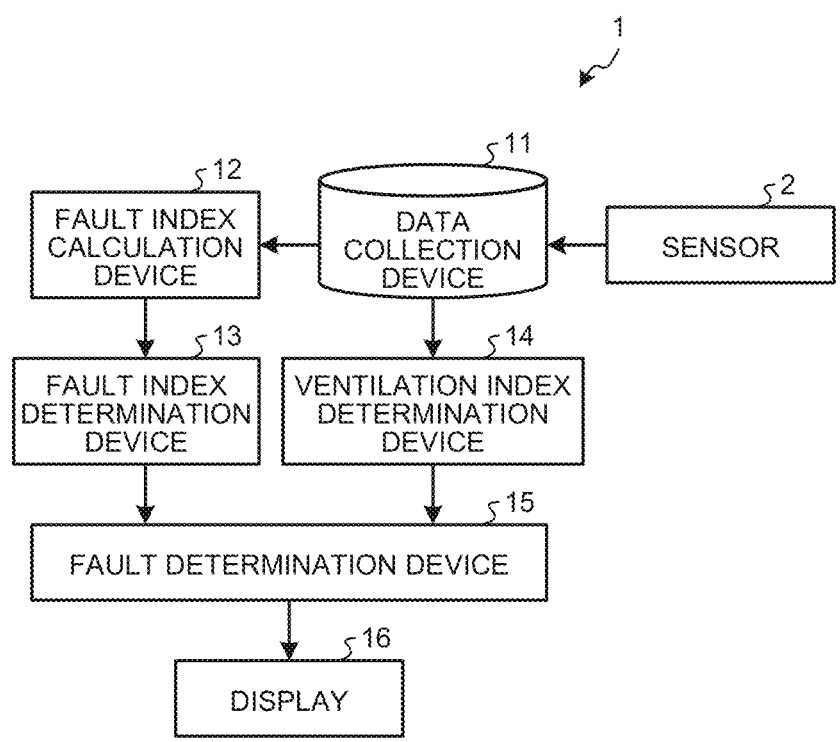
FIG. 1 is a block diagram that illustrates the configuration of a blast furnace fault determination apparatus according to a first embodiment of the present invention.

FIG. 1 is a block diagram that illustrates the configuration of the blast furnace fault determination apparatus according to the first embodiment of the present invention. As illustrated in FIG. 1, a blast furnace fault determination apparatus 1 according to the first embodiment of the present invention is used to determine a fault associated with operation of a blast furnace and a fault in a sensor 2 used for the blast furnace. Major components of the blast furnace fault determination apparatus 1 are a data collection device 11, a fault index calculation device 12, a fault index determination device 13, a ventilation index determination device 14, a fault determination device 15, and a display 16.

The data collection device 11 collects output values of the sensor 2 and stores the output values. A group of shaft-pressure sensors may be an Example of the sensor 2 whose output values are collected. The shaft-pressure sensors are installed to a plurality of places around a furnace body of a blast furnace, in the height direction and in the circumferential direction.

The fault index calculation device 12 calculates a blast furnace fault index using output values of the sensor 2 stored in the data collection device 11. The method to calculate the fault index is non-limiting, and any method is usable if the method can centrally manage a plurality of input data pieces to create a fault index. For example, the method may use the Q statistic described in Patent Literature 1, or create an index using independent component analysis, or create an index using a machine learning technique. Processing to standardize the fault index may be added to the above process. More specifically, the fault index is standardized by dividing an index calculated from data of a target to be determined by an index, as the stability limit value, calculated from an operation data group. In this calculation, the fault index becomes 1 at the stability limit.

The fault index determination device 13 determines whether the fault index, calculated by the fault index calculation device 12, exceeds a predetermined threshold, which is previously defined based on the stability limit data, and determines the presence or absence of a fault in a blast furnace. If the fault index standardization processing, in which, for example, the fault index becomes 1 at the stability limit, is added, the predetermined threshold may be set at 1.

The ventilation index determination device 14 calculates a blast furnace ventilation index using output values of the sensor 2 stored in the data collection device 11 and determines whether the calculated ventilation index exceeds a predetermined threshold, and determines the presence or absence of a fault in ventilation of the blast furnace. The ventilation index is calculated, for example, using the following expression (1). In the expression (1), the furnace pressure value A is an output value of a pressure meter A installed in the blast furnace. The furnace pressure value B is an output value of a pressure meter B installed in the downstream (an upper part of the blast furnace) relative to the pressure meter A in the direction of gas flow in the blast furnace. In the expression, X is a numerical value and is a parameter for adjustment to keep relation expressed between the amount of gas generation in the blast furnace and the ventilation index as linear as possible, for a change in the amount of gas generation in the blast furnace. The predetermined threshold may be smaller than a threshold used for fault determination of a ventilation index in usual operation. With the threshold set smaller, the blast furnace can be determined to be experiencing a fault condition, if the ventilation index indicates a slightly declining trend and the fault index is abnormal. Early detection of a fault in the blast furnace is therefore enabled, compared to conventional determination methods using only a ventilation index.

$$\text{Ventilation index} = \frac{\text{Furnace pressure value } A^2 - \text{Furnace pressure value } B^2}{(\text{Amount of gas generation in blast furnace})^{1 \cdot X}} \quad (1)$$

The fault determination device 15 makes a final and general determination on a fault in the blast furnace, based on fault determination results of the fault index determination device 13 and the ventilation index determination device 14.

The display 16 outputs and displays determination results of the fault determination device 15. When the blast furnace is determined to be experiencing a fault condition with both the fault index and the ventilation index exceeding the thresholds, the display 16 outputs and displays the determination result. An operator is notified of the result and encouraged to take actions, such as self-check.

If the ventilation index is determined to be normal whereas the fault index is determined to be abnormal, there is a possibility that a fault has occurred in the sensor 2. The display 16 notifies the operator of "sensor fault" and encourages to examine the sensor 2. Since the ventilation index originally has a threshold independent from the present invention, if the ventilation index alone exceeds the threshold, the operator is notified of occurrence of a fault condition by a conventional device.

As described above, the blast furnace fault determination apparatus 1 according to the first embodiment of the present invention calculates a ventilation index of the blast furnace, calculates a fault index indicative of the degree of fault in the blast furnace, and determines whether a blast furnace is experiencing a fault condition using the fault index and the ventilation index. The blast furnace fault determination apparatus 1 is therefore capable of determining a fault associated with operation and a fault in a sensor separately from each other. This configuration is effective in reducing detection errors of faults associated with operation, which is caused by a fault in the sensor. Furthermore, monitoring the ventilation resistance and the fault index together can increase the accuracy of determination of a fault in the blast furnace. It is therefore possible to take appropriate actions, such as a wind reduction, earlier upon occurrence of a fault condition, and thus to avoid a severe reduction in production output by reducing troubles caused by a fault condition.

Example

In this example, the Q statistic was calculated as the fault index. The principal component analysis was adopted for calculation of the Q statistic. Since this method is widely known, detailed explanation will be omitted (see Non Patent Literature 1). A plurality of data pieces used (input) in this example are output values of the shaft-pressure sensor group of the blast furnace. The Q statistic and principal component analysis, used for calculation of the Q statistic, will be described in a form corresponding to a blast furnace process. Principal component analysis is the mathematical processing that permutates (reduces the number of dimensions) a data group having a plurality of synchronized data pieces (in a plurality of dimensions) into a small number of variables in which characteristics of the original data group are sufficiently reflected, while minimizing the loss in the quantity of information of the original data group as much as possible. With regard to shaft pressure data of a blast furnace, one blast furnace is equipped with approximately 30 shaft pressure meters. If characteristics of 30 data groups can be permutated into several variables (principal component values) that sufficiently reflect the original characteristics, by using the principal component analysis, the conditions inside the furnace can be easily estimated by monitoring the small number of variables generated by the principal component analysis, without the necessity of observing all the 30 data groups.

Figure 2:
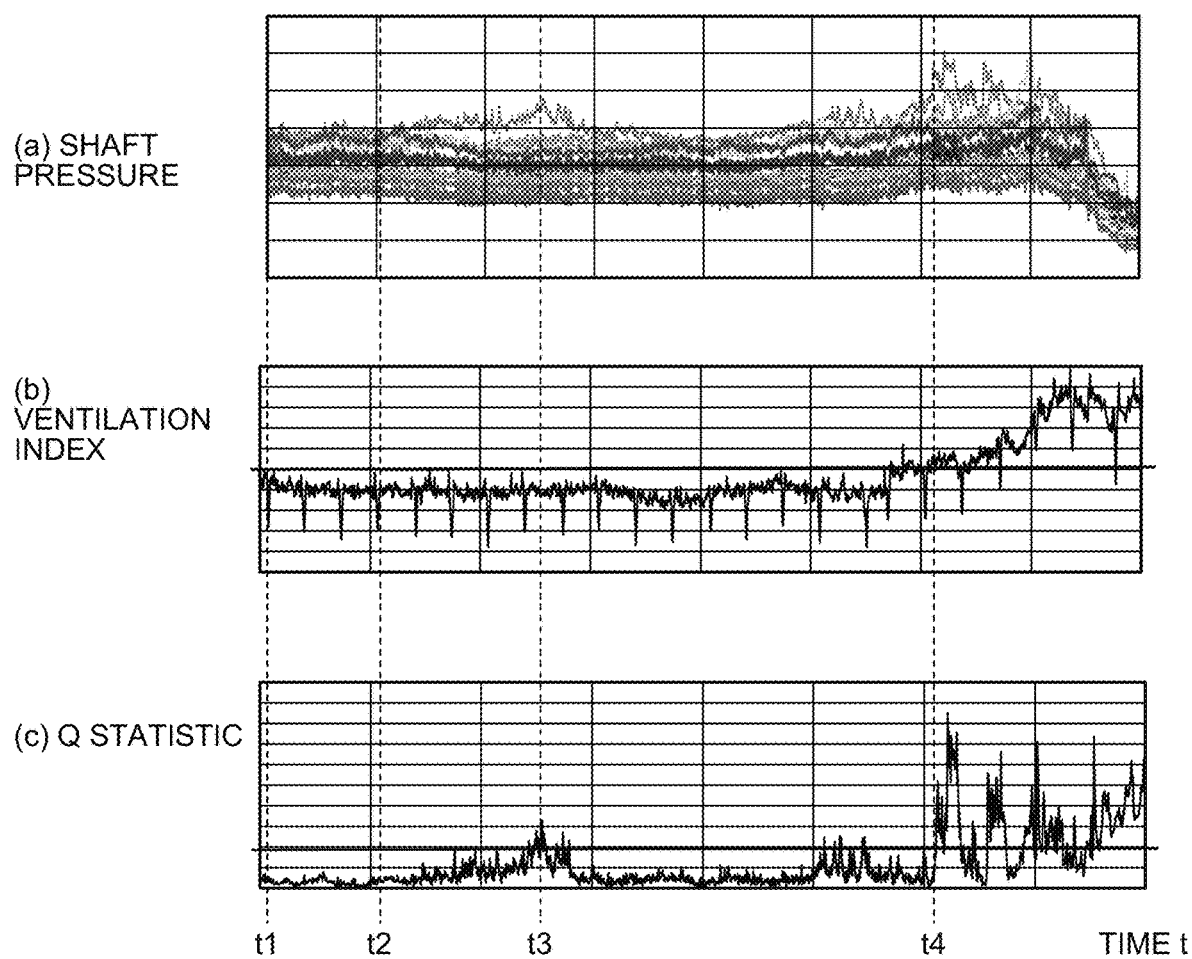
FIG. 2 incudes graphs that indicate examples in which the shaft pressure, the ventilation index, and the Q statistic vary over time.

In the shaft pressure data of the blast furnace, a component indicative of synchronized motion of the shaft pressures during stable operation of the blast furnace is the first principal component value having the largest variance in the principal component analysis. The second principal component and the subsequent components in the principal component analysis are components other than the synchronized component, and in this example, these components were used to determine a fault in the blast furnace. In this case, the Q statistic was calculated with only the first principal component considered as the principal component. FIG. 2(a) indicates time-series data of the shaft pressure used for calculation of the Q statistic. FIG. 2(c) indicates the calculated Q statistic. The Q statistic is small when the synchronized shaft pressure fluctuates during normal operation, as seen in the time interval t=t1 to t2, in FIG. 2. At the time t=t3, illustrated in FIG. 2, only the output value of one of the shaft pressure sensors markedly fluctuates without synchronizing with output values of other shaft pressure sensors. The Q statistic is therefore increased to exceed a threshold indicated by a bold line. As is apparent from this, using only the Q statistic for fault determination problematically leads into determination of a fault in the blast furnace. In this case, the Q statistic has increased because a shaft-pressure sensor was temporarily clogged. In other words, this phenomenon has happened because of a sensor fault, not because of an operational fault. At the time t=t3, the ventilation index illustrated in FIG. 2(b) does not exceed a threshold. This means that the furnace is not determined to be in a fault condition, provided that a fault is determined only when the ventilation index and the Q statistic both exceed the thresholds. As described above, such a case in which a sensor fault is determined to be an operational fault is avoided by monitoring both the Q statistic and the ventilation index at the same time. At the time t=t4, illustrated in FIG. 2, there are large variations among output values of a plurality of shaft pressure sensors. The Q statistic is accordingly increased to exceed the threshold. At this time, the ventilation index also exceeds the threshold. Since both the Q statistic and the ventilation index exceed the thresholds, operation of the blast furnace is determined to be in a fault condition. The operator is notified of the result from the display 16.

Second Embodiment

Figure 3:
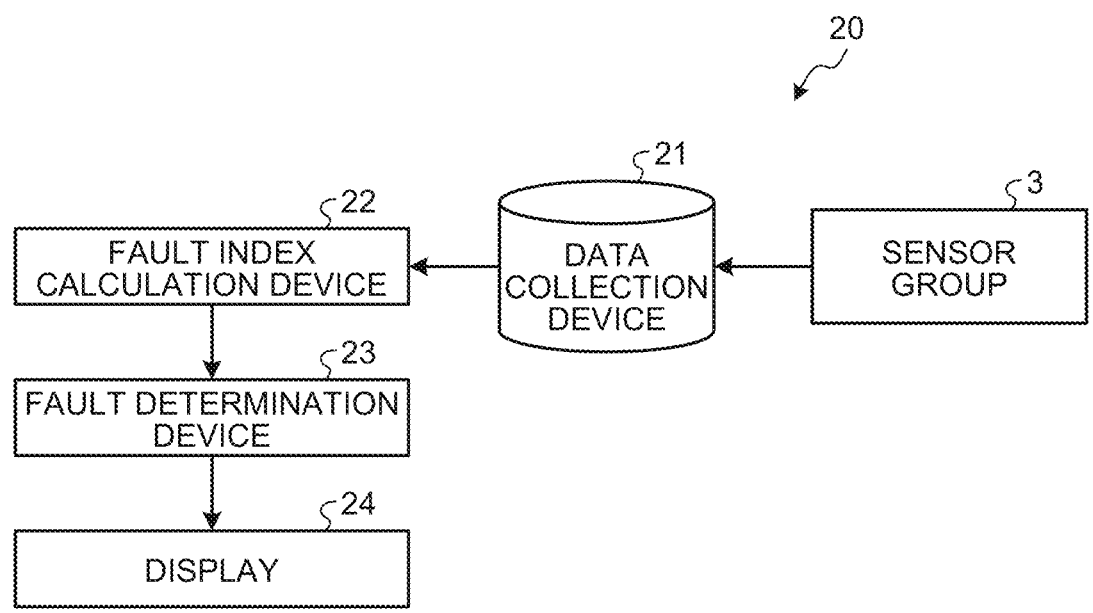
FIG. 3 is a block diagram that illustrates the configuration of a blast furnace sensor group fault determination apparatus according to a second embodiment of the present invention.

FIG. 3 is a block diagram that illustrates the configuration of a blast furnace sensor group fault determination apparatus according to a second embodiment of the present invention. As illustrated in FIG. 3, a blast furnace sensor group fault determination apparatus 20 according to the second embodiment of the present invention is used to determine faults of a sensor group 3 used for operation of a blast furnace. Major components of the blast furnace sensor group fault determination apparatus 20 are a data collection device 21, a fault index calculation device 22, a fault determination device 23, and a display 24.

The data collection device 21 collects output values of the sensor group 3 and stores the output values. Examples of the sensor group, of which output values are collected, include a shaft-pressure sensor group. The shaft-pressure sensor group is installed to a plurality of places around a furnace body of a blast furnace, in the height direction and in the circumferential direction.

The fault index calculation device 22 calculates a fault index on each sensor by performing principal component analysis (PCA) on output values of the sensor group 3 stored in the data collection device 21. More specifically, the fault index calculation device 22 calculates a fault index on each sensor by using the Q statistic as one of indexes of the multivariate statistical process control (MSPC) technique. A method to calculate the Q statistic is widely known as described in Non Patent Literature 1, and detailed description thus will be omitted. The Q statistic can be calculated using the following expression (2). In the expression (2), N represents the total number of sensors.

$$Q = \|x - \hat{x}\|^2 = \sum_{n=1}^{N} (x_n - \hat{x}_n)^2 \quad (2)$$

where x is an input variable, and $\hat{x}$ is an estimate in the PCA model.

The Q statistic is an index indicating the degree of deviation from correlation between variables included in data used for creation of the PCA model. An input variable that is abnormal can be detected by monitoring this index. Each element of the Q statistic represents the degree of attribution of the output value of a sensor to the Q statistic. It is therefore possible to know the output value of which sensor affects the detected fault by calculating a difference (degree of attribution) between an input variable (output value of a sensor) and an estimate of the input variable. More specifically, the degree of attribution can be calculated by the following expression (3). The quantified degree of attribution is used to make a fault determination of a sensor. Thresholds for fault determination of respective sensors may be unified (transformed into the same value) by performing standardization (a mean 0, a variance 1) on the output values of the sensors. In this manner, a sensor estimated to be faulty can be presented by using a fault determination threshold previously set for the degree of attribution of each sensor.

$$\text{Degree of attribution} = |X_n - \hat{X}_n| \quad (3)$$

Principal component analysis is the mathematical processing that permutates (reduces the number of dimensions) a data group having a plurality of synchronized data pieces (in a plurality of dimensions) into a small number of variables in which characteristics of the original data group are sufficiently reflected, while minimizing the loss of the quantity of information included in the original data group as much as possible. With regard to shaft pressure data of a blast furnace, one blast furnace is equipped with approximately 30 shaft pressure sensors. If characteristics of 30 data groups can be permutated into several variables (principal component values) that sufficiently reflect the original characteristics, by using the principal component analysis, the conditions inside the furnace can be easily estimated by monitoring the small number of variables generated by the principal component analysis, without the necessity of observing all the 30 data groups. Synchronization means that operational behavior of the variables is in coordination with one another relative to time transition in the process or an operational action.

In the shaft pressure data of the blast furnace, a component representing synchronized motion of the shaft pressures during stable operation of the blast furnace is the first principal component value having the largest variance in the principal component analysis. Components other than the first principal component in the principal component analysis represent unsynchronized motion. If there is a sensor having a large degree of non-synchronization compared to other sensors, the sensor can be determined to be faulty. In this example, with only the first principal component of the principal components taken into consideration, fault determination is made by calculating a difference between the above-described input variable and an estimate of the first principal component of the input variable as the Q statistic and by using the absolute value (the degree of attribution) of each element of the Q statistic as the degree of non-synchronization.

The fault determination device 23 determines a fault in a sensor based on the fault index calculated by the fault index calculation device 22. More specifically, the fault determination device 23 determines a fault in a sensor by comparing the size between the degree of attribution, calculated by the fault index calculation device 22, of a measured value of a sensor to the Q statistic and a predetermined threshold. The predetermined threshold may be determined with reference to output values of the sensor previously determined to be abnormal.

The display 24 outputs and displays the determination result of the fault determination device 23. If a sensor fault is detected, a determination result indicative of a sensor fault is output and displayed on the display 24 to notify an operator of the result and encourage to take actions, including, for example, sensor check.

As described above, the blast furnace sensor group fault determination apparatus 20 according to the second embodiment of the present invention performs the principal component analysis on output values of the sensor group 3, calculates the Q statistic and the degree of attribution, and compares the size between calculated data and a predetermined threshold, and determines whether there is a fault in the sensor group 3. This manner allows earlier detection of a type of fault that is difficult to be detected using thresholds set for the output values of the sensor group 3 and allows a maintenance staff to examine and recover the sensor upon detection. Early recovery of the sensor allows determination of a fault associated with operation using a plurality of sensors. Accuracy of fault determination is therefore further enhanced.

Example use of the first and the second embodiments will be described. When a fault in a sensor is detected using the first embodiment, the sensor detected to be faulty is removed from calculation of the Q statistic. The Q statistic is then recalculated using the second embodiment. Subsequently, whether there is a fault in the blast furnace may be determined with reference to both the recalculated Q statistic and the ventilation index. This processing first removes a sensor that is estimated to be faulty and then continues fault determination using the Q statistic and the ventilation index, based on values of the other sensors. Accuracy of fault determination is therefore further enhanced. The processing can be repeatedly performed on sensors determined to be faulty. Sensors determined to be faulty are presented to a maintenance staff for examination and recovery.

Example

Figure 4:
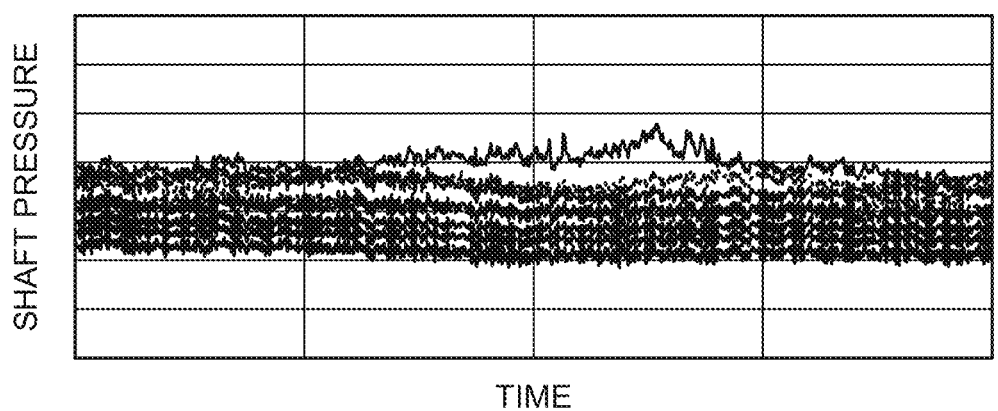
FIG. 4 is a graph that indicates an example in which the shaft pressure varies over time.
Figure 5:
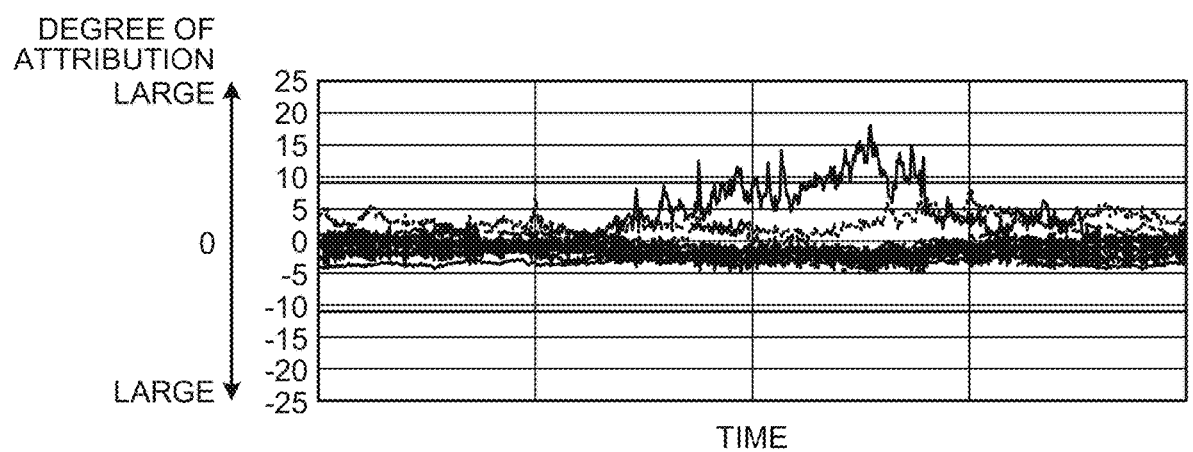
FIG. 5 is a graph that indicates an example in which the degree of attribution varies over time.

In this example, processing of standardization (a mean 0, a variance 1) was performed on each data piece of the shaft-pressure sensor group. The processing of standardization used time-series data taken while normal operation is conducted using normal sensors. The Q statistic was calculated on the standardized data, and a difference (degree of attribution) between an input variable and an estimate of the input variable was calculated. Fault determination was performed on the degree of attribution, using a threshold. FIG. 2 indicates the shaft pressure used for the calculation. In the example of FIG. 4, one of sensor output values gradually separates from move of other sensor output values, and then returns. FIG. 5 illustrates a difference (the degree of attribution) between an input variable and an estimate of the first principal component of the input variable in the same time range. As illustrated in FIG. 5, a sensor demonstrating unusual behavior has a large degree of attribution. In the graph of FIG. 5, the degree of attribution becomes smallest at zero, and increases with an increase of the absolute value. Fault determination was made with reference to the degree of attribution by using a threshold. In this case, as illustrated in FIG. 5, the threshold was set at +/−10, and the conditions where the threshold exceeded +10 or fell below −10 were determined to be fault. The threshold for fault determination was determined with reference to calculation results obtained from data including actual sensor faults, using the present method. In this data using the above threshold, one of sensors has been determined to be faulty in the course of the process.

INDUSTRIAL APPLICABILITY

According to the present invention, a blast furnace fault determination apparatus, a method for determining a fault in a blast furnace, and a method for operating a blast furnace are provided that can determine a fault associated with operation and a fault in a sensor separately from each other.

REFERENCE SIGNS LIST

1 BLAST FURNACE FAULT DETERMINATION APPARATUS
2 SENSOR
3 SENSOR GROUP
11, 21 DATA COLLECTION DEVICE
12, 22 FAULT INDEX CALCULATION DEVICE
13 FAULT INDEX DETERMINATION DEVICE
14 VENTILATION INDEX DETERMINATION DEVICE
15, 23 FAULT DETERMINATION DEVICE
16, 24 DISPLAY
20 BLAST FURNACE SENSOR GROUP FAULT DETERMINATION APPARATUS

The invention claimed is:

1. A blast furnace fault determination apparatus comprising
a processor configured to:
calculate a fault index indicative of a degree of fault in a blast furnace, wherein the fault index is a Q statistic based on principal component analysis;
calculate a ventilation index of the blast furnace; and
determine a fault condition in the blast furnace using the fault index and the ventilation index; and
a sensor fault identification unit configured to evaluate a degree of attribution on the Q statistic and identify a faulty sensor based on the degree of attribution in a case where the ventilation index does not exceed a predetermined threshold and the Q statistic exceeds a predetermined threshold.

2. The blast furnace fault determination apparatus according to claim 1, wherein the processor is configured to calculate the fault index using an output value of a shaft-pressure sensor group installed around a furnace body of the blast furnace.

3. The blast furnace fault determination apparatus according to claim 1, wherein the processor is configured to continue a fault determination by removing a signal value of a sensor identified as the faulty sensor based on calculation of the Q statistic and calculating a new Q statistic.

4. The blast furnace fault determination apparatus according to claim 1, wherein the ventilation index is calculated by following expression (1), and a parameter X in the expression (1) is a numerical value adjusted to allow an amount of gas generation in the blast furnace and the ventilation index to be expressed in a substantially linear relation for a change in the amount of gas generation in the blast furnace $$\text{Ventilation index} = \frac{\text{Furnace pressure value } A^2 - \text{Furnace pressure value } B^2}{(\text{Amount of gas generation in blast furnace})^{1-X}}. \tag{1}$$

5. A method for determining a fault in a blast furnace, the method comprising:
calculating a fault index indicative of a degree of fault in the blast furnace, wherein the fault index is a Q statistic based on principal component analysis;
calculating a ventilation index of the blast furnace;
determining a fault condition in the blast furnace using the fault index and the ventilation index; and
evaluating a degree of attribution on the Q statistic and identifying a faulty sensor based on the degree of attribution in a case where the ventilation index does not exceed a predetermined threshold and the Q statistic exceeds a predetermined threshold.

6. A method for operating a blast furnace, the method comprising:
operating the blast furnace while determining a fault condition in the blast furnace using the blast furnace fault determination apparatus according to claim 1.

* * * * *